United States Patent [19]
Schultz

[11] 3,717,670
[45] Feb. 20, 1973

[54] PRODUCTION OF CARBOXYLIC ACIDS AND ESTERS

[75] Inventor: Robert G. Schultz, St. Louis, Mo.

[73] Assignee: Monsanto Company, St. Louis, Mo.

[22] Filed: Aug. 2, 1968

[21] Appl. No.: 749,760

[52] U.S. Cl. ............260/476 R, 252/430, 252/431 N, 252/431 P, 252/431 R, 252/434, 252/441, 252/447, 260/410.9 R, 260/413, 260/488 K, 260/491, 260/493, 260/496, 260/515 R, 260/532, 260/537 R, 260/540, 260/541

[51] Int. Cl. ....C07c 51/12, C07c 51/14, C07c 67/00

[58] Field of Search............260/532, 496, 515, 514 C, 476 R, 260/413, 491, 493, 541, 410.9, 488 K, 468 CB

[56] References Cited

UNITED STATES PATENTS

| | | | |
|---|---|---|---|
| 2,739,169 | 3/1956 | Hagemeyer, Jr. | 260/540 |
| 2,710,878 | 6/1955 | Glasebrook | 260/532 |
| 3,020,314 | 2/1962 | Alderson | 260/533 |
| 3,065,242 | 11/1962 | Alderson et al. | 260/497 |
| 3,168,553 | 2/1965 | Slaugh | 260/497 |
| 3,338,961 | 8/1967 | Closson et al. | 260/544 |
| 3,367,961 | 2/1968 | Brewbaker | 260/486 |

*Primary Examiner*—Vivian Garner
*Attorney*—Herbert B. Roberts, M. N. Cheairs and Herman O. Bauermeister

[57] ABSTRACT

The present invention relates to a process for the preparation of carboxylic acids and esters, specifically by the reaction of alcohols and carbon monoxide in the presence of a supported catalyst comprising a rhodium component in combination with a metal compound selected from the IB, IIIB, IVB, VB, VIB, VIII, lanthanide and actinide groups of the Periodic Table dispersed on a carrier, the said reaction being conducted in the presence of a halide promoter. The process is also directed to the production of mixtures of organic acids together with organic esters.

33 Claims, 1 Drawing Figure

3,717,670

PATENTED FEB 20 1973

INVENTOR
ROBERT G. SCHULTZ

BY Herman O. Bauermeister
ATTORNEY

PRODUCTION OF CARBOXYLIC ACIDS AND ESTERS

This invention relates to a process for the preparation of carboxylic acids and esters. More particularly, it relates to a vapor phase process for the reaction of alcohols and carbon monoxide in the presence of catalyst compositions essentially comprising a rhodium component in combination with a metal compound selected from the IB, IIIB, IVB, VB, VIB, VIII, lanthanide and actinide groups of the Periodic Table dispersed upon a carrier in the presence of a halide promoter to yield carboxylic acids and esters selectively and efficiently.

Carbonylation processes for the preparation of carboxylic acids from alcohols are well known in the art and have been directed especially to the production of acetic acid by the carbonylation of methanol. The prior art teaches the use of a number of catalysts for the synthesis of carboxylic acids by reaction of alcohols with carbon monoxide at elevated temperatures and pressures in both gas phase, fixed bed reactions and liquid phase reactions. Catalysts such as phosphoric acid, phosphates, heavy metal salts such as zinc and cuprous chlorides, silicates of various metals, and boron trifluoride in various hydration states have been reported to function for the production of acetic acid by reaction of methyl alcohol and carbon monoxide at elevated temperatures and pressures of the order of 400°C and 10,000 psig, respectively. However, even under such severe conditions the yields of acid were substantially poor, and, therefore, uneconomical. Somewhat less severe reaction conditions of temperature and/or pressure have been reported in the literature employing specific catalyst compositions, e.g., 330°–340°C using liquid phosphoric acid containing copper phosphate; 300°–500°C, and 2,000–4,000 psig using active charcoal impregnated with phosphoric acid; and 260°–360°C and 2,800–15,000 psig using metal carbonyls, such as iron, cobalt and nickel, in conjunction with their halides or free halogens in the liquid phase. Even using these specific catalyst compositions at the less severe reaction conditions, substantially poorer yields of the desired carboxylic acid product and substantially slower reaction rates are obtained than those achieved in the process of this invention.

Certain disadvantages present in the carbonylation processes described in the prior art are catalyst instability, lack of product selectivity, and low levels of catalyst reactivity, and in processes wherein there is a liquid phase present, the need for large and costly recovery, catalyst regeneration and catalyst recycle to the reactor. One particular disadvantage of carbonylation processes of the prior art is their dependence upon the use of catalysts comprised of metals which readily form volatile carbonyls or metal carbonyls including dicobalt octacarbonyl, iron carbonyl and nickel carbonyl, all of which require the use of high partial pressures of carbon monoxide to remain stable under the necessarily high reaction temperatures employed. For example, dicobalt octacarbonyl requires partial pressures of carbon monoxide as high as 3,000 psig to 10,000 psig under normal carbonylation conditions of 175°C to 300°C. In contradistinction, the present vapor phase process is effective at low pressures, e.g., down to a total pressure of 1 atmosphere, or less.

Still another disadvantage of carbonylation processes disclosed in the prior art is their relatively low level of activity. This low level of activity requires higher catalyst concentrations, longer reaction times, and higher temperatures to obtain substantial reaction rates and conversions. Consequently, larger and costlier processing equipment is required.

Another disadvantage of carbonylation processes disclosed heretofore is their inability to maintain high selectivity to the desired carboxylic acid at temperatures required for high conversion levels and high reaction rates. At these higher temperatures undesirable by-products comprising substantial amounts of aldehydes, higher carboxylic acids, carbon dioxide, methane and water are formed, thereby resulting in substantial yield losses and necessitating additional product purification and recycle steps in the processing.

One particular disadvantage of carbonylation processes of the prior art is their dependence upon the use of liquid phase catalyst systems comprised of cobalt carbonyls or certain modified cobalt carbonyls dissolved in a liquid reaction medium. In liquid phase systems, additional processing steps are necessary for separation of products from the catalyst solutions, and there are always handling losses of the catalyst. This handling of the catalyst solution in liquid phase processes requires the use of large and costly processing equipment for separation of the product, and for catalyst recovery and catalyst recycle to the reaction zone. Also, the losses of the metal component due to handling of the catalyst solutions are costly because the metals per se are very expensive. For example, the prior art carbonylation reaction utilizing a cobalt catalyst in liquid phase suffers a serious disadvantage due to substantial losses of the cobalt component by separation so that the cobalt plates out as an inactive coating on the walls of the reactors and piping. This is a serious defect since significant losses of catalyst occur.

The present invention using a solid catalyst comprising a rhodium component in combination with a metal compound selected from the IB, IIIB, IVB, VB, VIB, VIII, lanthanide and actinide groups of the Periodic Table, or preferably a rhodium component in combination with a metal compound selected from the compounds of chromium, tungsten, titanium, zirconium, vanadium, molybdenum, lanthanium, thorium, uranium and iron, overcomes the above difficulties inherent in the handling and processing of a liquid reaction medium by providing a system for continuous separation of products from the solid catalytic phase. These advantages are even more important when utilizing a catalyst comprised of an expensive metal compound, where utilization in industrial applications requires an absolute minimum of catalyst losses.

It is, therefore, an object of the present invention to provide a process in which the catalyst is maintained in a solid phase so as to eliminate or minimize handling and losses of the catalyst.

Another disadvantage of carbonylation processes described in the prior art is their dependence on catalyst systems which require the use of substantially chemically pure carbon monoxide feedstocks to maintain high selectivity and high yield to the desired carboxylic acid product. For example, certain cobalt containing catalyst systems described heretofore when employed with carbon monoxide feed streams containing impurities such as hydrogen, result in the production of a number of undesirable byproducts including methane, carbon dioxide, aldehydes, alcohols of the same carbon number as the desired carboxylic acid, and carboxylic acids of higher carbon number than desired. Consequently, substantial loss in selectivity and yield to the desired carboxylic acid occurs. Catalysts of the prior art cause the formation of troublesome gaseous by-products such as carbon dioxide and methane as well as high proportions of ethers in the reactor system, thereby suppressing the carbon monoxide partial pressure and ultimately causing a decrease in the desired carbonylation reaction rate (with the system at constant pressure).

It is, therefore, an object of the present invention to overcome the above disadvantages and thus provide an improved and more economically and commercially feasible carbonylation process for the production of organic acids and their esters.

Another object of this invention is to provide a more reactive and more stable carbonylation catalyst composition than has been heretofore described in the prior art.

Still another object of the present invention is to provide a more selective and more reactive carbonylation catalyst composition for the production of carboxylic acids.

Another object of the present invention is to provide a carbonylation catalyst composition which results in the production of a higher yield of the desired carboxylic acid with minimum formation of ethers, aldehydes, higher carboxylic acids, carbon dioxide, methane, water and other undesirable byproducts.

Still another object of the present invention is the provision of an improved carbonylation process enabling the efficient and selective production of carboxylic acids or their esters by reaction of alcohols and alcohol derivatives with carbon monoxide in the presence of an improved and more stable catalyst, thus enabling the use of lower catalyst concentration, lower temperature, lower pressure, and shorter contact time than has been generally possible heretofore, and eliminating product isolation, catalyst recovery and recycle steps, and also solvent recovery.

Another object of the present invention is to provide novel heterogeneous catalyst comprising the combination of an inert carrier having dispersed thereon a rhodium component described below.

These and other objects of the present invention will become apparent to those skilled in the art from the accompanying description and disclosure.

In accordance with the present invention, alcohols having $n$ carbon atoms ($n$ is 1 to 20) are converted to a mixture comprised of an acid having $n + 1$ carbon atoms and the ester of the said alcohol with the said acid, by reacting the alcohol or an alcohol derivative in the vapor phase with carbon monoxide at temperatures from 50°C to 500°C and at partial pressures of carbon monoxide from 0.1 psia to 15,000 psia, preferably 5 psia to 3,000 psia, and more preferably 10 psia to 700 psia, although higher pressure may be employed, in the presence of a catalyst system essentially comprised of a rhodium component described below. The rhodium containing component is dispersed upon a carrier. The carrier or substrate which is employed in the present catalysts consists of a porous solid of such size that it can be employed in fixed or fluidized bed reactors, e.g., from 400 mesh/inch to ½-inch particle sizes. The range of variation of the pore volume relative to solid weight is from 0.03 to 2.5 cm$^3$/gram of the porous phase, with a preferred range of from 0.05 to 1.5 cm$^3$/gram.

The carrier materials are exemplified, but not limited by pumice, alumina, silica, silica-alumina, aged or deactivated silica-alumina cracking catalyst, magnesia, diatomaceous earth, bauxite, titania, zirconia, clays, both natural and acid treated such as Super-Filtrols, attapulgus clay (attapulgite), lime, magnesium silicate, silicon carbide, activated and unactivated carbons, zeolites as well as the zeolitic molecular sieves, solid foams, such as ceramic honeycombs, and porous organic polymers. The above carriers are used as regular and irregular particles and as capillary tubes, and interspacing elements such as shapes, extrudates, ceramic rods, balls, broken pieces, tiles, and the like, disposed within the reactor.

As referred to above, for purposes of the present invention, the catalyst as charged consists of a rhodium component dispersed upon the above-mentioned supports which has also been treated with other metal salts. The catalyst preferably includes a rhodium component dispersed upon a system consisting of a different metal component dispersed upon a support. In addition, the rhodium component and other metal salts may be co-dispersed (impregnated upon the support at the same time) or the different metal component may be dispersed upon a system consisting of a rhodium component dispersed upon a support. The catalyst may be composed of two distinct components, namely the active catalyst metal component portion, e.g., the aforesaid rhodium and other metal components, and a halogen promoting portion as the second component which may or may not be catalytically active, but which aids the reaction in various ways, such as by facilitating cleavage of the carbon-oxygen bond in the alcohol, or by rendering the rhodium species less volatile or more stable. The halogen promoter may be introduced at the catalyst preparation step or may be introduced into the catalyst from the reactants, with the resultant transformation of the precursor rhodium species to a more active form.

As a result of the contacting of the rhodium component containing catalyst with the halogen promoter and feedstocks, the ultimate active rhodium species may exist as a coordination compound of rhodium, and other metals present, carbon monoxide, and a halide such as chloride, bromide, and iodide, as well as suitable amine, organophosphine, organoarsine, and/or organostibine ligands and, if desired, other ligands, e.g., halide such as chloride, iodide and bromide and trihalostannate such as the corresponding chloride, bromide or iodide. Such ligands, including other metals present, are necessary to satisfy the coordination number and oxidation number of the central metal atom, rhodium, and thus form a coordination compound or complex of rhodium in which it is possible that one or more other ligand positions is occupied by a group attached to the surface of the supporting structure, for example the secondary metal component on the support or the support itself, e.g., carbon.

The term coordination compound or coordination complex used throughout this specification means a compound or complex formed by combination of one or more electronically rich molecules or atoms capable of independent existence with one or more electronically poor molecules or atoms, each of which may also be capable of independent existence.

In carrying out the preferred embodiment of the invention, the process of dispersal of the secondary metal component upon the above-described support may result either in a salt of the said metal (e.g., titanium trichloride), in a metal oxide (e.g., chromium trioxide) or in a free metal (e.g., copper) being deposited upon the support from a solution or dispersion. Prior to treatment with the rhodium component, the precursor to the different secondary metal component is heated to effect any decomposition (e.g., metal nitrate to metal oxide) or otherwise fix the component to the support.

In a similar manner, the dispersal of the rhodium component upon the system of the different metal component dispersed on the support may result either in a rhodium salt (e.g., rhodium trichloride), a rhodium complex containing carbon monoxide and halogen promoter (e.g., $[Rh(CO)_2(I)_2]^-$), or in decomposition products of rhodium salt (e.g., rhodium oxide from rhodium nitrate). Optionally, the rhodium component on the catalyst support may be treated with hydrogen at elevated temperatures to cause at least partial reduction of the rhodium component to rhodium components of lower valency such as rhodium (I) or rhodium metal.

The secondary metal component may also be dispersed, such as by co-precipitation with the rhodium component, or may be deposited upon the previously prepared system of the rhodium component dispersed on the support as described above.

Modifying treatments of the present supported rhodium components described above may also be used to incorporate the promoting halogen portion or second component of the catalyst system. Such promoting components include a halogen and/or halogen compound such as hydrogen halide, alkyl- or aryl-halide, metal halide, ammonium, phosphonium, arsonium, stibonium halide, etc., and may be the same or different from any halogen component already present in the active catalytic portion or first component of the catalyst system. Halogen or halide compounds are suitable for the promoter portion of the catalyst, but those containing iodine and bromine are preferred. Accordingly, suitable promoters comprising the second portion of the catalyst system of this invention may be selected from the following list of preferred halogen and/or halogen containing compounds:

$RX_n$ ($n$ is 1 to 3) where
R = any alkyl-, alkylene or aryl-group and
X = Cl, Br, or I e.g., $CH_3I$, $C_6H_5Br$, $CH_3CH_2I$, $ICH_2CH_2I$, etc.
$X_2$ or $X_3^-$ where
X = Cl, Br, or I, e.g., $Br_2$, $I_2$, $I_3^-$, etc.
Hx where
X = Cl, Br, or I, e.g., HBr, HI $$R\underset{O}{\overset{\;}{C}}X \quad \text{where} \quad R = \text{any alkyl- or aryl-group} \quad \text{e.g., } CH_3\underset{O}{\overset{\;}{C}}I, \text{etc.}$$
and  X = Cl, Br, or I $R_4MX$, $R_4MX_3$, or $R_3MX_2$ where
R = hydrogen or any alkyl- or aryl- group
M = N, P, As, or Sb
X = Cl, Br, or I e.g., $NH_4I$, $PH_4I_3$, $PH_3I_2$, $PH_3Br_2$, $(C_6H_5)_3PI_2$, and/or combinations of R, M, and X The halogen promoter portion or second component of the catalyst may be charged to the reactor separately from the active catalyst or first component, or it may be incorporated onto the active component, for example, by impregnation onto the catalyst. The active supported rhodium compound or first component of the catalyst system may be prepared prior to charging into the reactor in a separate activation procedure or may be generated in the reactor. Subsequently, after the first component is in the reactor, the promoter or second component of the catalyst may be added in the feed as a gaseous or liquid compound or as a solution in a suitable solvent. However, the promoter portion of the catalyst may also be incorporated in the active catalyst or first component either during the activation or during the in situ generation of the active catalyst. For example, to prepare the catalyst system, the first component of the catalyst system, e.g., rhodium nitrate is dissolved in a suitable solvent, and is subsequently impregnated upon an inert support or carrier preferably containing the secondary metal component as discussed herein.

The solvent which is used to dissolve the rhodium and other metal components is a liquid having a low boiling point, e.g., high vapor pressure under reaction conditions. The range of variation of the boiling point (NBP, 760 mm Hg) is quite broad, a preferred range being from 10°C to 140°C. A preferable group of volatile solvents includes chloroform, carbon tetrachloride, benzene, acetone, methanol, ethanol, isopropanol, isobutanol, pentane, hexane, cyclohexane, heptane, toluene, pryidine, diethylamine, acetaldehyde, acetic acid, tetrahydrofuran and water. Choice of a particular solvent is dependent in part on the nature of the metal components employed.

The preparation of the solid phase catalyst is carried out by dissolving or dispersing the rhodium and the other metal components in the above-described volatile solvents. The solid carrier is then impregnated with the solutions or slurries of the metal components, for example, by pouring the solutions or slurries upon the carrier, or immersing the solid carrier in the excess of the liquid solutions or slurries, with the excess being subsequently removed.

The impregnated support or carrier is then maintained at a temperature sufficient to volatilize the low boiling solvent, e.g., at a temperature between 15°C and 325°C, to permit drying of the composite solid catalyst. A vacuum may also be applied to the catalyst in order to volatilize the solvent, although the use of vacuum is not essential. During this stage of the process, the volatile solvent evaporates from the solid catalytic product, and the rhodium component is converted to the active supported catalyst.

For example, to prepare the catalyst system, the first component of the catalyst system, e.g., a rhodium salt such as $Rh(NO_3)_3 \cdot 2H_2O$ is dissolved in a suitable solvent such as water. This solution may be impregnated upon a carrier or, alternatively, the solution may have the promoter added to the solution. The second or promoter component may, for example, be added to the above solution, e.g., as aqueous HI, or methyl iodide or other iodine or bromine containing compound.

This catalytic solution containing the necessary rhodium component and halide components is then ready for impregnation upon the carrier as discussed above. Often it may be beneficial and desirable to have the concentration of the second component or promoter portion of the catalyst system, for example, iodide such as HI or $CH_3I$, in excess of that required to form a stoichiometric compound such as described above. The present discussion is based upon the catalyst precursors as charged. The ultimate nature of the catalyst as modified by reaction conditions, and the presence of promoters and reactants has not been completely elucidated. However, it has been found that the use of the components described herein provides a highly superior catalyst and process for the production of acids.

Suitable feedstocks are alcohols although the alcohol may be charged together with ether, alkyl halide or ester as discussed below. Preferred alcohols have one carbon atom less than the desired carboxylic acid product. These feedstocks also include halide, ester, and other derivatives of the desired alcohol feedstock.

Examples of preferred feedstocks employed for the carbonylation reaction of the present invention include the group of aliphatic alcohols having one to 20 carbon atoms, and aromatic alcohols having from six to 10 carbon atoms including methanol, ethanol, propanol and isopropanol, the butanols, pentanols, benzyl alcohol, phenol and hexanols, and also the higher alcohols such as the decanols, including isomeric forms. However, an alcohol is the preferred feedstock. For example, if acetic acid is the desired product, the feedstock may consist of methyl alcohol, or derivatives thereof, such as dimethyl ether, methyl acetate, methyl iodide and/or combinations of these.

In accordance with the present invention the carbonylation reaction may be carried out by intimately contacting an alcohol with gaseous carbon monoxide in the vapor phase. The temperature preferably is in the range of 50°C to 500°C with the preferred range being 200°C to 325°C. Partial pressures of carbon monoxide of the order of 0.1 psia to 15,000 psia may be employed; however, 5 psia to 3,000 psia carbon monoxide partial pressure is generally preferred and a more preferred range is from 10 psia to 700 psia. Higher pressures may be used if desired under appropriate conditions.

In typical carbonylation process, selective to carboxylic acid, one mole of carbon monoxide reacts with each hydroxyl group (molar basis). More or less carbon monoxide from the aforesaid stoichiometric amount, however, may be present. Carbon monoxide streams containing inert impurities such as hydrogen, carbon dioxide, methane, nitrogen, noble gases, water and paraffinic hydrocarbons having from one to four carbon atoms may be employed, if desired, for example, from an available plant gas stream, to good effect; however, in such cases total reactor pressure will have to be increased to maintain a desired carbon monoxide partial pressure. The concentration of carbon monoxide in the feed gas mixture is from 1 vol. percent to 99.9 vol. percent, a preferred range being from 10 vol. percent to 99.9 vol. percent.

The reaction rate is dependent upon catalyst concentration upon the support and temperature. Concentrations of the rhodium compound or the first component of the supported catalyst system in the vapor phase, between 0.01 wt. percent and 10 wt. percent are normally employed, with the preferred range being 0.1 wt. percent to 5 wt. percent. Higher concentrations even to the extend to 20 wt. percent may, however, be used if desired. Higher temperatures also favor higher reaction rates.

The concentration of the other metal component upon the support may vary between 0.01 wt. percent and 50 wt. percent with the preferred range being between 0.5 wt. percent and 20 wt. percent. A most preferred range is between 1 wt. percent and 10 wt. percent.

As a result of the use of a halogen promoter in the feed, as well as by initial incorporation of the promoter onto the support, the second component or promoter may accumulate upon the supported catalyst. The concentration of the second component or promoter portion on the support may vary widely over the broad concentration range of 0.01 wt. percent to 30 wt. percent, based on halogen atom. In the process of this invention, however, the preferred concentration range of promoter is 1 wt. percent to 20 wt. percent, relative to the weight of the support.

In carrying out of the above described invention for the production of high proportion of acid, e.g., acetic acid, as the desired product, the charge to the reactor may be pure or may include by products which are recycled with the alcohol feed. The purification system may therefore employ a distillation train to recover the acetic acid product by distillation, while the remaining lower boiling components are recycled.

The present process may be operated to produce high proportions of the carboxylic acid or the ester of such carboxylic acids with the feed alcohol to obtain high productivity. Various alcohols may be charged as the alcohol feed, for example, the charging of ethanol yields as primary products propionic acid and ethyl propionate. If it is desired to increase the proportion of acid, the ester may be recycled to the primary reactor, or may be introduced into another reactor (together with water) for the purpose of forming the acid in a separate zone. When charging a mixture of alcohol and ester, there are particular molar ranges of ratios of alcohol to ester which are conducive to the formation of certain product distributions, with the broad range of 0.001 to 10,000 moles of alcohol per mole of ester.

Thus the use of an alcohol-ester feed in a ratio of alcohol to ester no more than about 2, preferably 0.001 to 2 (any including a substantially pure ester as the feed) yields a product with a high proportion of acid, e.g., reaching substantially 100 percent carboxylic acid. Alternatively, the use of a ratio of alcohol to ester greater than about 10, preferably 10 to 10,000 (including a substantially pure alcohol feed) yields a product with a very high proportion of the ester, e.g., reaching substantially 100 percent ester.

When ester is present in the feedstock, it is normally charged with equimolar amounts of water, although more or less water may be used. The reference to the ester in the above ratios, is on the basis that a molar quantity of water is present equivalent to the number of moles of ester present.

Within the latter alcohol/ester feedstock ratio range of 10 to 10,000 there exist two alternative embodiments of the invention. In the first such embodiment the product consists essentially of 100 percent ester at alcohol conversion levels up to about 90 mole percent; at above about 90 percent alcohol conversion level, the product is substantially completely the acid.

Similarly, ratios of alcohol of ester in the feed, in the range of 2 to 10, permit obtaining various proportions of acid and ester as mixtures in the product.

The above cases are summarized below:

| Alcohol/Ester Ratio | Major Product |
|---|---|
| 0.001 to 2 | acid |
| 2 to 10 | mixed acid and ester |
| 10 to 10,000 a) to about 90% alcohol conv. | ester |
| b) above about 90% alcohol conv. | acid |

An example of the above described embodiment for the production of high proportion of acid, e.g., acetic acid, as the desired product, the charge to the reactor includes a relatively low proportion of the alcohol. Thus in the production of acetic acid, the ratio is no more than 2 moles of methanol per mole of methyl acetate.

In carrying out a second embodiment, described above, for the production of high proportion of ester, e.g., methyl acetate, as the desired product, the charge to the reactor includes a relatively high proportion of the alcohol, e.g., greater than 10 moles of methanol per mole of methyl acetate. Consequently, the purification system employs a distillation train to recover the methyl acetate by distillation, while the remaining components consisting principally of the unreacted feedstocks, methyl iodide (or other halide promoters), methanol and water are recycled. The methyl acetate is hydrolyzed for example by contacting with steam, as described herein, thus isolating the acetic acid with the recovery of methyl alcohol, which may be recycled. However, the ester product is often used, per se for example, as a solvent in chemical processing or for the formulation of coating compositions.

The reactants which are used in the present process are essentially aryl- and alkyl-alcohols, and alcohol derivatives such as ethers, esters and organic halides having from 1 to 10 carbon atoms, including both straight chain and branched chain components. The second essential component is carbon monoxide. However, the carbon monoxide need not be a high purity stream such as has been required by the prior art processes. Instead, the carbon monoxide may be a low-concentration mixture containing from 1 vol. percent to 99.9 vol. percent of carbon monoxide, with the remainder of the gas mixture being comprised of gases selected from the group consisting of nitrogen, hydrogen, carbon dioxide, nobel gases, water and paraffinic hydrocarbons having from one to four carbon atoms. Preferred ranges of carbon monoxide are from 30 vol. percent to 70 vol. percent carbon monoxide with the above gases.

It has been found that water generally exerts a beneficial effect on the rate of reaction. However, adding water, with the feed in excess of the equimolar quantity, e.g., an excess of 50 percent to 300 percent of such equimolar quantity, already present with ester, as discussed above, promotes the production of the carboxylic acid. On the other hand smaller quantities of water, e.g., 50 to 100 percent of the equimolar proportions discussed above, favor the production of ester.

The supported rhodium catalysts of the present invention are characterized by an unusually high degree of specificity for the carbonylation reaction, e.g., the reaction of alcohols with carbon monoxide to obtain a carboxylic acid. Such control over the various competing reactions to obtain the carboxylic acid in high yield is surprising since other metal catalysts do not show such specificity for this reaction. The iron group metals such as iron, cobalt and nickel differ from the present rhodium catalysts in that the iron group metals simultaneously catalyze the hydrogenation reactions. Consequently, the products from iron, cobalt or nickel catalysts include the next higher alcohols as well as aldehydes and carboxylic acids having two more carbon atoms that the starting alcohols. Furthermore, the iron group catalysts, particularly cobalt, require a far higher carbon monoxide partial pressure to remain active. When moderate pressures, e.g., less than about 2,000 psig carbon monoxide partial pressure are employed, at a temperature of 175°C, the cobalt catalyst is found to plate out or decompose to the free metal which plates on the walls of the reactor and is thus lost as a catalyst.

The other metal components used in the catalysts herein described of themselves possess little or no carbonylation activity and serve only to increase the activity of the rhodium component used. The reason for this effect is unknown but may be due to a change in oxidation state balance or ligand arrangement about the rhodium.

Another distinction of the rhodium catalysts of the present invention over the cobalt catalysts is the elimination of undesired gaseous byproducts, including carbon dioxide and methane which are obtained as a result of the water-gas shift reaction catalyzed by cobalt. Furthermore, significant quantities of the undesirable byproduct, dimethyl ether, are also formed in the presence of the cobalt catalyst system. This ether compound attains a very high partial pressure at the reaction conditions employed, and necessitates the use of a high total pressure reaction system to maintain the necessary partial pressure of carbon monoxide for reaction to form carboxylic acids, e.g., 2,000 psig total pressure for 750 psig carbon monoxide partial pressure, at a reaction temperature of 175°C.

The present rhodium catalysts are also superior to platinum as a catalyst typical of the platinum group. For example, the present rhodium catalyst operates at yields greater than 95 percent to the carboxylic acid at substantially 100 percent alcohol conversion. In contrast, an analogous catalyst prepared by thermally decomposing palladium nitrate, supported upon a chromium oxide-containing carbon, shows only 1 percent of the activity of the present rhodium catalyst derived from the thermal decomposition of rhodium nitrate under comparable reaction conditions.

Figure 1:
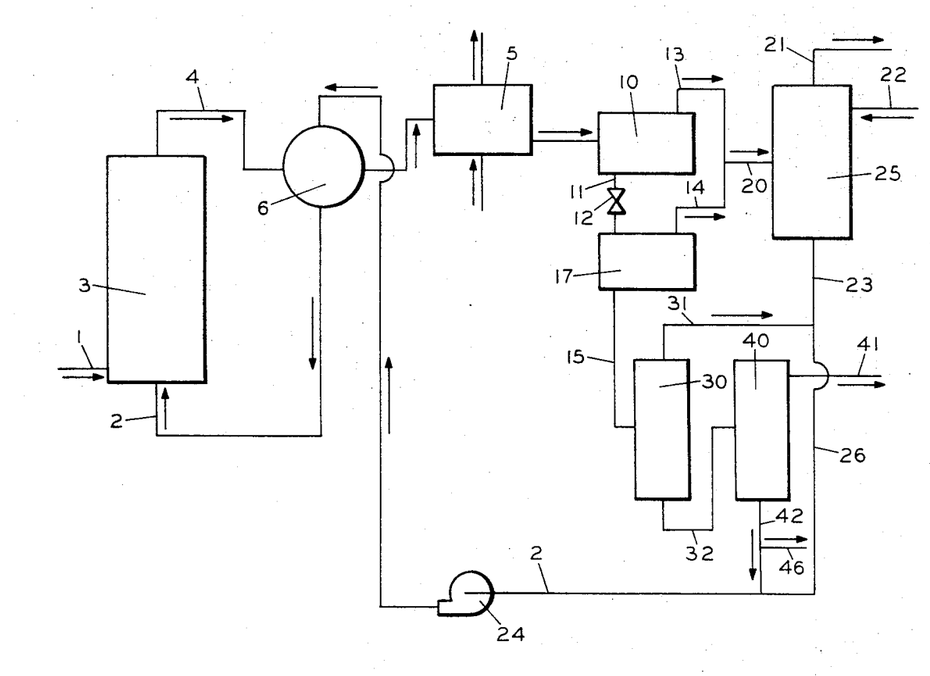

For a better understanding of the process of the present invention, the drawings form a part of the present specification and also illustrate certain embodiments of the invention but are not limitative thereto. FIG. 1 illustrates a process wherein the carbon monoxide is introduced by line 1 into reactor 3 containing the supported rhodium catalyst. The gas stream may also contain components which are inert to the reaction, such as hydrogen, nitrogen, methane, etc., in addition to the carbon monoxide. The reactor 3 contains 1,000 pounds of a catalyst composed of activated carbon of ¼-inch particle size, containing 1 percent by weight of a rhodium component calculated as elemental rhodium and prepared as discussed above.

The normal gas rate to the reactor 3 is 85 lb/min of carbon monoxide. The reactor operates at 275°C and 100 psig pressure. Line 2 serves to introduce methanol feed plus recycled methyl acetate, unreacted methanol, methyl iodide, etc.

The gaseous reactor effluent exits through line 4 and is used to preheat the feed in exchanger 6. Line 4 is further cooled in exchanger 5, and goes to high pressure separator 10. The condensed liquid from separator 10 is removed through line 11; the pressure is let down through valve 12, and the liquid then goes to low pressure separator 17. The gas leaving the low pressure separator 17, through line 14, consisting principally of carbon monoxide, methyl iodide, methanol and methyl acetate, mixes with the gas effluent from the high pressure separator line 13 which is principally carbon monoxide, and enters the methanol scrubber 25 through line 20. In the scrubber 25, feed methanol introduced through line 22 at a rate of about 80 lb/min is used to remove the small amount of methyl iodide, methyl acetate, acetic acid, and other volatile components from the gas before it leaves the system. The effluent gas exiting through line 21 may either be recycled or, if the inert gas content is high, it may be vented or burned. The feed methanol and recovered components are removed from scrubber 25 through line 23.

The liquid effluent from separator 17 is removed through line 15. This effluent is introduced into distillation column 30 where the lower boiling compounds are separated from acetic acid. The lower boiling components consisting principally of methyl acetate, methyl iodide, unreacted methanol, and other volatile components, exit through line 31 and mix with the liquid effluent from the scrubber, line 23 to become line 26.

The acetic acid and other higher boiling compounds are removed as line 32 from column 30 and enter distillation column 40. In this column acetic acid which may contain water is separated from the other high boiling components.

The acetic acid product is withdrawn as line 41, and this product may be further purified to remove water. The high boiling components exit through line 42 and mix with line 26 to become the reactor feed, line 2, after being pressured through pump 24 and preheated in exchanger 6. A small liquid purge stream may be withdrawn as line 46 to prevent build-up of high boiling compounds.

The process of the present invention may be operated either as a batch or a continuous process. The present solid catalyst may be employed as a fixed or fluid bed. The reactor may consist of a series of catalyst beds with interstage cooling between the beds or the catalyst may be placed in tubes with a heat exchange medium around the tubes. These tubes containing catalyst may be run in parallel or series. The metal content of the catalyst may be varied through the reactor to provide operating advantages. A bed of the catalyst support, per se, without metal components, may also be used so that the gas stream passes through such a bed in order to pick up any catalyst swept out of the reactor. It is also an embodiment of the invention to use either upflow or down-flow of the reactants through the reactor, with periodic reversal of the gas stream also being contemplated, to provide operating advantages such as maintaining a clean catalyst bed.

For a better understanding of the process of the present invention specific embodiments of the process are presented below. These examples and illustrations are not to be construed in any way limiting to the scope of the invention. The preparation of catalysts for the process of this invention is carried out using a variety of methods.

In a preferred method, the rhodium component is dispersed upon the support and the halogen promoter is subsequently added in the reactor feed.

EXAMPLE 1

This example illustrates a method of catalyst preparation without the added promoting other metal component. A solid supported catalyst containing a rhodium component dispersed upon an inert support is prepared in the following manner: 3.0 grams of rhodium nitrate dihydrate having the formula $Rh(NO_3)_3 \cdot 2 H_2O$ is dissolved in 50 ml of water as solvent. The resulting solution is added to 30 g. of a support consisting of 12–30 mesh high surface area carbon.

The mixture is dried at 25°C in air for 8 to 16 hours and then vacuum dried at 110°C for 8 to 16 hours. The catalyst is then thermally decomposed in nitrogen at 275°C for 1 hour. The supported catalyst (10 ml) is charged into an 18-inch Pyrex glass vertical reactor 30 mm in diameter. The resulting catalyst bed, 2 cm in depth, is covered with 100 ml of inert packing as a preheater. The process is conducted at a feed rate (moles per hour) of $CH_3OH$, 0.27; $CH_3I$, 0.02; and $CO$, 0.50. The pressure at which the gaseous reactants contact the supported catalyst is 1 atm. at a reaction temperature of 210°C.

The reactor effluent contains the desired carboxylic acid product, including the ester of the acid product and alcohol feedstock, water and unreacted alcohol, carbon monoxide and promoter. The selectivity of alcohol conversion to the desired carboxylic acid and its ester is essentially 100 percent. Chromatographic analysis indicates that no substantial production of byproducts such as aldehydes, higher boiling carboxylic acids and/or alcohols, methane or carbon dioxide occurs.

The conversion obtained in this example amounts to 17.7 g.total acetate/g.Rh/hr. (acetate includes acetic acid and the methyl acetate which is easily converted to acid). The isolated product is found to have the following analysis in weight percent:

| | |
|---|---|
| Methyl ether | 0.6 wt. % |
| Methanol | 49.6 wt. % |
| Methyl iodide | 17.2 wt. % |
| Methyl acetate | 24.6 wt. % |
| Acetic acid | 3.0 wt. % |

Water                                    5.0 wt. %

36 wt. percent of the methanol fed to the reactor is converted to products. When the above example is repeated using the molar equivalent amount of 2.37 g. of rhodium trichloride trihydrate having the formula $RhCl_3 \cdot 3H_2O$ in place of the rhodium trinitrate dihydrate, the comparable results are production of 8.4 g. acetate/g.Rh/hr. with the isolated product having the following analysis in weight percent:

| | |
|---|---|
| Methyl ether | 0.5 wt. % |
| Methanol | 66.0 wt. % |
| Methyl iodide | 15.5 wt. % |
| Methyl acetate | 14.1 wt. % |
| Acetic acid | 1.0 wt. % |
| Water | 2.9 wt. % |

15 wt. percent of the methanol fed to the reactor is converted to products. In a similar manner when the procedure of this example is modified by inclusion of 0.16 moles/hr. of water in the gaseous feed a conversion of 13.2 g. acetate/g.Rh/hr. is obtained.

When this experiment is conducted in separate tests with the equivalent molar quantity of cobalt nitrate decomposition products, only trace proportions of acetate acid are obtained (together with traces of higher acids and esters), while the corresponding use of ruthenium nitrate decomposition products shows less than 10 percent of the productivity of the above rhodium nitrite decomposition products.

process conditions are described in Example 1.

The reactor effluent contains the desired carboxylic acid product, including the ester of the acid product and alcohol feedstock, water, and unreacted alcohol, carbon monoxide and promoter. The selectivity of alcohol conversion to the desired carboxylic acid and its ester is essentially 100 percent. Chromatographic analysis indicates that no substantial production of byproducts, such as aldehydes, higher boiling carboxylic acids and/or alcohols, methane or carbon dioxide occurs.

The conversion obtained in this example amounts to 25.1 g. acetate/g.Rh/hr. and the isolated product is found to have the following analysis in weight percent:

| | |
|---|---|
| Methyl ether | 0.8 wt. % |
| Methanol | 45.2 wt. % |
| Methyl iodide | 18.8 wt. % |
| Methyl acetate | 22.0 wt. % |
| Acetic acid | 8.9 wt. % |
| Water | 4.3 wt. % |

The amount of 40.5 wt. percent of the methanol fed to the reactor is converted to product.

EXAMPLES 3 to 8

Examples 3 to 8 are shown in Table 1 and demonstrate the beneficial effects of even low levels of chromium trioxide in the catalyst. Significant increases in activity occur at all levels of chromium trioxide while in the absence of rhodium (Example 3) no methanol carbonylation occurs.

TABLE 1

| Example [a] | Weight percent $Rh_2O_3$ | Weight percent $CrO_3$ | Conversion, g. acetate, g. Rh/hr. | Product distribution, weight percent | | | |
|---|---|---|---|---|---|---|---|
| | | | | $CH_3OH$ | $CH_3COOH$ | $CH_3COOCH_3$ | $CH_3I$ |
| 3 | 0 | 8 | 0 | 72.3 | 0 | 0 | 23.6 |
| 4 | 3.0 | 0 | 20.0 | 54.0 | 2.0 | 20.8 | 19.1 |
| 5 | 3.0 | 1 | 26.3 | 47.1 | 6.2 | 23.8 | 17.8 |
| 6 | 3.0 | 4 | 27.7 | 43.9 | 8.9 | 23.3 | 17.9 |
| 7 | 3.0 | 8 | 25.1 | 45.2 | 8.9 | 22.0 | 18.8 |
| 8 | 3.0 | 16 | 24.3 | 44.2 | 8.7 | 22.1 | 19.3 |

[a] Process conditions as in Example 1.

EXAMPLE 2

This example illustrates a method of catalyst preparation (Preparation Method A) using the added promoting metal component. A solid supported catalyst containing a rhodium component dispersed upon chromium trioxide on carbon is prepared in the following manner: 12.0 g. of chromic acid having the formula $CrO_3$ is dissolved in 210 ml of water as solvent. To the resulting solution is added 138 g. of 12–30 mesh high surface area carbon.

The mixture is dried at 25°C in air for 8 to 16 hours and then vacuum dried at 110°C for 8 to 16 hours. The chromium trioxide/carbon mixture is then heated in a nitrogen stream at 275°–300°C for one-half hour.

A solution of 4.05 g. $Rh(NO_3)_3$ in 90 ml water is prepared. To this solution is added 60 g. of the 8 percent chromium trioxide/carbon prepared above. The mixture is dried at 25°C in air for 8 to 16 hours and then vacuum dried at 110°C for 8 to 16 hours. The catalyst is then heated at 275°C in nitrogen for 1 hour. The supported catalyst (10 ml) is charged into an 18-inch Pyrex glass vertical reactor 30 mm in diameter. The resulting catalyst bed, 2 cm in depth, is covered with 100 ml of inert packing as a preheater. The

EXAMPLE 9

This example illustrates another method of catalyst preparation using the added promoting metal component (Preparation Method B). A solid supported catalyst containing a rhodium component dispersed upon tungsten oxide ($WO_3$) on carbon is prepared in the following manner: 17.2 g. of tungstic acid ($WO_3 \cdot H_2O$) is suspended in 250 ml of water. To this slurry is added, with vigorous stirring, 150 g. of 12–30 mesh high surface area carbon.

The mixture is dried at 25°C in air with occasional stirring to ensure even absorption of the tungstic acid. The catalyst is then dried in vacuum at 110°C for 8 to 16 hours and then heated in a nitrogen stream at 275°–300°C for one-half hour.

A solution of 4.05 g. $Rh(NO_3)_3$ in 90 ml of water is prepared. To this solution is added 60 g. of the 8 percent tungstic oxide/carbon support. The mixture is dried at 25°C in air for 8 to 16 hours and in vacuum at 110°C for 8 to 16 hours. The catalyst is then heated in nitrogen at 275°C for 1 hour. The resulting catalyst (10 ml) is charged to a reactor and run as described in Example 1. Results obtained with this catalyst are given in Table 2.

EXAMPLE 10

This example illustrates another method of catalyst preparation using the added promoting metal component (Preparation Method C). A solid supported catalyst containing a rhodium component dispersed on titanium trichloride ($TiCl_3$) on carbon is prepared in the following manner: 34.3 g. of titanium trichloride is dissolved in 250 ml of water as a solvent. To this solution is added 150 g. of 12–30 mesh high surface area carbon.

The mixture is dried at 25°C in air for 8 to 16 hours and then vacuum dried at 110°C for 8 to 16 hours. The titanium trichloride is fixed onto the support by heating at 275°–300°C in nitrogen for 1 hour.

The preparation of the rhodium containing catalyst and its use in methanol carbonylation are as described in Example 2. Results obtained with this catalyst are given in Table 2.

EXAMPLE 11

This example illustrates still another method of catalyst preparation using the added promoting metal component (Preparation Method D). A solid supported catalyst containing a rhodium component dispersed on chromia ($Cr_2O_3$) on carbon is prepared in the following manner: 20.52 g. of chromium trinitrate monohydrate ($Cr(NO_3)_3 \cdot 9H_2O$) is dissolved in 60 ml of water as solvent and 45 g. of 12–30 mesh high surface area carbon added to the solution.

The mixture is dried in air for 8 to 16 hours at 25°C and then vacuum dried at 110°C for 8 to 16 hours. The chromium nitrate is then decomposed to chromium oxide, $Cr_2O_3$, by heating to 275°–300°C in nitrogen for 1 hour.

The preparation of the rhodium containing catalyst and its use in methanol carbonylation are as described in Example 2. Results obtained with this catalyst are given in Table 2.

EXAMPLE 12

This example illustrates another method of catalyst preparation using the added promoting metal component (Preparation Method E). A solid supported catalyst containing a rhodium component dispersed on zirconia ($ZrO_2$) on carbon is prepared in the following manner: 34.5 g. of tetra-isopropyl zirconate $[Zr(OCH(CH_3)_2)_4]$ is dissolved in 500 ml of ethyl alcohol as a solvent and 150 g. of 12–30 mesh high surface area carbon added to the solution.

The excess ethyl alcohol is allowed to evaporate and the mixture dried at 25°C for 8 to 16 hours. Water (200 ml) is then added to decompose the tetra-isopropyl zirconate to zirconium hydroxide. The mixture is again dried at 25°C for 8 to 16 hours. The catalyst is dried in vacuum at 110°C for 8 to 16 hours and then heated to 275°C in nitrogen for one-half hour.

The preparation of the rhodium containing catalyst and its use in methanol carbonylation are as described in Example 2. Results obtained with this catalyst are given in Table 2.

EXAMPLE 13

This example illustrates still another method using the added promoting metal component (Preparation Method F). Solutions of rhodium trinitrate (0.506 g.) and palladium dinitrate (0.45 g.) in water (total volume 15 ml) are mixed and 9.6 g. high surface area carbon is added to the solution.

The mixture is air dried for 8 to 16 hours at 25°C and then vacuum dried at 110°C for 8 to 16 hours. The nitrate salts are decomposed to their respective oxides by heating to 275°–300°C in nitrogen for 1 hour.

Use of this catalyst for methanol carbonylation is as described in Example 2. Results obtained with this catalyst are given in Table 2.

EXAMPLES 14–26

In Table 2 are given the results obtained with a series of other metal components containing rhodium catalysts used in methanol carbonylation. The different preparation methods used are indicated. It may be seen that in every case a significant increase in catalyst activity is obtained over the unpromoted catalyst (Example 4), except in Example 22 showing the use of iron oxide, $Fe_2O_3$, as a typical component normally found in the ash constitutes of a carbon. Similar results are obtained when the secondary metal component is deposited on the rhodium or is co-deposited with the rhodium from the same solution upon the inert carrier.

TABLE 2

| Example | Preparation method | Metal component (percent) | Conversion, g. acetate, g. Rh/hr. | Product distribution, weight percent | | | |
|---|---|---|---|---|---|---|---|
| | | | | $CH_3OH$ | $CH_3COOH$ | $CH_3COOCH_3$ | $CH_3I$ |
| 4 | A | None | 20.0 | 54.0 | 2.0 | 20.8 | 19.1 |
| 7 | A | $Cr_3$ (8) | 25.1 | 45.2 | 8.9 | 22.0 | 18.8 |
| 9 | B | $WO_3$ (9.7) | 38.8 | 27.0 | 4.7 | 40.3 | 19.0 |
| 10 | C | $TiCl_3$ (18.6) | 36.7 | 23.6 | 4.6 | 41.0 | 19.8 |
| 11 | D | $Cr_2O_3$ (8) | 24.7 | 49.4 | 7.3 | 21.6 | 16.4 |
| 12 | E | $ZrO_2$ (8) | 26.0 | 43.6 | 0.9 | 30.5 | 18.8 |
| 13 | F | PdO (1.8) | 24.1 | 53.5 | 1.8 | 19.2 | 21.2 |
| 14 | D | $VO_2$ (8) | 34.8 | 29.8 | 13.4 | 28.6 | 19.6 |
| 15 | B | $V_2O_3$ (8) | 33.4 | 37.4 | 11.1 | 25.4 | 19.6 |
| 16 | B | $MoO_3$ (8) | 29.8 | 37.8 | 5.4 | 30.9 | 20.0 |
| 17 | D | $La_2O_3$ (8) | 24.3 | 45.0 | 5.0 | 26.1 | 19.6 |
| 18 | D | $ZrO_2$ (8) | 25.6 | 42.3 | 1.3 | 29.4 | 20.3 |
| 19 | D | $ThO_2$ (8) | 28.2 | 41.4 | 2.9 | 30.5 | 19.6 |
| 20 | D | $UO_3$ (8) | 27.3 | 43.2 | 1.5 | 30.8 | 18.3 |
| 21 | E | $TiO_2$ (8) | 23.7 | 43.7 | 0.7 | 28.7 | 20.0 |
| 22 | D | $Fe_2O_3$ (8) | 16.7 | 54.4 | 1.1 | 19.9 | 19.0 |
| 23 | D | CoO (8) | 20.2 | 53.2 | 1.0 | 19.7 | 20.1 |
| 24 | D | NiO (8) | 31.2 | 42.2 | 1.3 | 29.8 | 12.6 |
| 25 | D | CuO (8) | 22.6 | 43.3 | 3.6 | 24.2 | 21.7 |
| 26 | F | $Ag_2O$ (1.8) | 22.6 | 54.4 | 1.8 | 18.6 | 20.1 |

Similar results are obtained using Preparation Method C (Example 10) with the added promoting metal salt being nickel sulfate, chromium trichloride, nickel acetylacetonate or chromium phosphate.

EXAMPLES 27-31

Examples 27-31 are shown in Table 3 and demonstrate the beneficial effects of operating the carbonylation process at higher temperature and pressure.

Significant increase in reactivity occurs at higher temperature and/or pressure with no ill effect on the supported rhodium catalyst system. By suitable adjustment of operating conditions, productivity of carbonylated product (carboxylic acid plus carboxylate portion of ester) in terms of grams of product per hour per gram of rhodium can exceed values of 300 g.acetate/g.Rh/hr. The catalyst life of the above catalyst is greater than 500 hours.

EXAMPLE 32

Wherein the process of Example 2 is conducted employing individual runs, which use equimolar feeds of ethanol, n-butanol, and benzyl alcohol, respectively, in place of the methanol, the corresponding major products are propionic, pentanoic and phenylacetic acids, respectively.

EXAMPLE 33

This example demonstrates that the reaction may be carried out in the presence of hydrogen without the formation of undesirable products such as acetaldehyde, ethanol nor catalyst decomposition. This example is similar to Example 2 except that the reaction is carried out with a carbon monoxide gas feed varying from the pure carbon monoxide of Example 2, by containing hydrogen as an impurity, e.g., 62 vol. percent carbon monoxide and 38 vol. percent hydrogen. The results are similar to that of Example 2. No substantial amounts of reduced materials or other byproducts such as aldehydes, dimethyl ether, ethanol, higher boiling carboxylic acids, methane, carbon dioxide, etc., are detected by gas chromatography, thus distinguishing from another parallel test using cobalt chloride catalyst, which yields such byproducts as the result of hydrogenation catalyzed by the cobalt.

A similar result is obtained with another synthetic gas mixture, e.g., a 66 vol. percent hydrogen, 33 vol. percent carbon monoxide, such as is obtained from a commercial unit. The various impurities, e.g., nitrogen, hydrogen, carbon dioxide and paraffinic hydrocarbons of 1 to 4 carbon atoms, which are present in such feed gas mixtures, do not adversely affect the present reaction.

EXAMPLE 34

The present example shows the use of dimethyl ether in an amount corresponding to 10 molar percent relative to the methanol in the feed, in an amount corresponding to the molar proportion of methanol of Example 2. An equivalent molar proportion of water is also charged. A similar result is obtained to the results of Example 2 in achieving the production of acetic acid. A similar result is obtained when the feedstock contains 10 molar percent methyl acetate with the methanol, and also with an excess of water, 10 percent over the stoichiometric amount. Consequently, methyl acetate, dimethyl ether, as well as an alkyl halide, e.g., methyl iodide in the present example can be used in place of, or in addition to, the alcohol feed.

EXAMPLE 35

When the process of Example 2 is repeated, but with the substitution of an equimolar proportion of methyl bromide for methyl iodide, a similar product distribution is obtained. However, the reaction rate is somewhat lower.

Polyhydric alcohols, cyclic ethers, and lactones may also be employed as starting materials for the production of polybasic acids, for example, 1,4-butanediol to yield adipic acid, ethylene oxide to yield succinic acid. These feedstocks when subjected to reaction with carbon monoxide under the conditions described herein with the catalyst of the invention yield polybasic acids or esters including lactones.

The present invention is also distinguished over the prior art in the use of an alcohol as the preferred feedstock, without the necessity of the presence of olefins to form the desired carboxylic acid and ester. The present catalysts have been found to avoid the formation of hydrocarbons such as olefins which are undesirable in the process.

TABLE 3

[Catalyst of Example 2 at various operating conditions $Rh_2O_3/GrO_3/BPL$ carbon]

| | Operating conditions | | | | Molar feed ratio | | | Product distribution, weight percent | | | | $CH_3OH$ conversion |
|---|---|---|---|---|---|---|---|---|---|---|---|---|
| Example | Temp., °C. | Total press., p.s.i.g. | Part. press. CO, p.s.i.a. | Feed rate, moles/hr. | MeI | MeOH | CO | $CH_3OH$ | $CH_3COOH$ | $CH_3CO(OCH_3)$ | $CH_3I$ | |
| 27 | 221 | 50 | 40 | 5.28 | 1 | 12.7 | 24.2 | 48.2 | 3.5 | 33.6 | 12.5 | 22.5 |
| 28 | 285 | 200 | 152 | 3.97 | 1 | 12.3 | 26.2 | 0.9 | 58.0 | 24.7 | 15.2 | 78.5 |
| 29 | 230 | 100 | 73 | 1.77 | 1 | 64.5 | 133. | 25.2 | 10.3 | 60.3 | 4.5 | 39.6 |
| 30 | 205 | 200 | 147 | 1.77 | 1 | 295. | 600. | 72.1 | 0.2 | 25.8 | 0.3 | 18.3 |
| 31 | 242 | 200 | 145 | 1.75 | 1 | 13.2 | 30. | 0.3 | 65.8 | 14.2 | 14.6 | 83.6 |

What is claimed is:

1. A process for the carbonylation of reactants selected from the group consisting of acyclic saturated hydrocarbon alcohols having one to 20 carbon atoms, mono-cyclic aromatic hydrocarbon alcohols having six to 10 carbon atoms, methyl acetate, ethyl propionate, methyl iodide and dimethyl ether, said process comprising contacting (1) at least one of said reactants, (2) carbon monoxide, (3) a supported rhodium component, (4) a supported metal component, and (5) a halogen component wherein during said contacting said rhodium component, said metal component and said halogen component are present in an amount sufficient to catalyze the carbonylation of said reactants, said contacting being carried out with the reactants and products in the vapor phase and at a temperature in the range of 50° to 500°C and when said reactants consist of methyl acetate, ethyl propionate, methyl iodide or dimethyl ether said contacting is also in the presence of water, said rhodium component of (3) is provided by a material selected from the group consisting of rhodium metal, simple rhodium salts, rhodium oxides, and coordination compounds of rhodium having at least one halogen ligand and at least one other ligand selected from carbon monoxide and trihalostannate ligands, said metal component of (4) is provided by a material selected from free metals, metal salts, and metal oxides of metals from I-B, III-B, IV-B, V-B, VI-B, VIII, the lanthanide and actinide groups of the Periodic Table and said halogen component of (5) is provided by bromine, iodine, a bromide compound or an iodide compound.

2. A process as in claim 1 in which the said halogen component of (5) is provided by iodine or iodide compounds.

3. A process as in claim 2 in which at least a portion of said halogen component of (5) is provided by an alkyl iodide in which the said alkyl radical has from one to 20 carbon atoms.

4. A process as in claim 1 in which the carbon monoxide is supplied as a gas mixture containing from 1 vol. percent carbon monoxide to 99.9 vol. percent carbon monoxide, and with the remainder of said gas mixture being selected from the group consisting of nitrogen, noble gases, hydrogen, carbon dioxide, water and paraffinic hydrocarbons having from one to four carbon atoms.

5. A process as in claim 1 in which the partial pressure of carbon monoxide is from 0.1 psia to 15,000 psia.

6. A process as in claim 1 in which said rhodium component of (3) and said metal component of (4) are supported on activated carbon.

7. A process as in claim 6 in which at least one of said reactants is methanol, and at least a portion of said halogen component of (5) is present as methyl iodide.

8. The process of claim 1 wherein said rhodium component of (3) is provided by rhodium oxide and wherein said metal component of (4) is provided by an oxide of a metal from the I B, III B, IV B, V B, VI B, VIII, the lanthanide and actinide groups of the Periodic Table.

9. The process of claim 8 wherein at least a portion of said halogen component of (5) is present as iodine or an iodide compound.

10. The process of claim 9 wherein at least a portion of said iodide compound is an alkyl iodide having from one to 20 carbon atoms.

11. The process of claim 10 wherein at least a portion of said reactants of (1) is an alkanol.

12. The process of claim 10 wherein at least one of said reactants of (1) is benzyl alcohol.

13. The process of claim 10 wherein at least one of said reactants of (1) is selected from the group of methanol and methyl acetate.

14. The process of claim 13 wherein said alkyl iodide is methyl iodide.

15. The process of claim 1 wherein said metal component of (4) is selected from the free metals, salts and oxides of chromium, tungsten, titanium, zirconium, vanadium, molybdenum, lanthanum, thorium, uranium, nickel and iron dispersed upon a carrier.

16. A process as in claim 15 in which at least one of said reactants of (1) is benzyl alcohol.

17. A process as in claim 15 in which the said metal component is a salt or oxide of chromium.

18. A process as in claim 15 in which the said metal component is a salt or oxide of tungsten.

19. A process as in claim 15 in which the said metal component is a salt or oxide of titanium.

20. A process as in claim 15 in which the said metal component is a salt or oxide of zirconium.

21. A process as in claim 15 in which the said metal component is a salt or oxide of vanadium.

22. A process as in claim 15 in which the said metal component is a salt or oxide of molybdenum.

23. A process as in claim 15 in which the said metal component is a salt or oxide of lanthanum.

24. A process as in claim 15 in which the said metal component is a salt or oxide of thorium.

25. A process as in claim 15 in which the said metal component is a salt or oxide of uranium.

26. A process as in claim 15 in which the said metal component is a salt or oxide of nickel.

27. A process as in claim 15 in which the said metal component is a salt or oxide of iron.

28. The process of claim 15 wherein at least one of said reactants of (1) is methanol.

29. A process as in claim 28 in which the partial pressure of carbon monoxide is from 0.1 psia to 15,000 psia.

30. A process as in claim 28 in which at least a portion of said halogen component of (5) is provided by iodine or iodide compounds.

31. A process as in claim 30 in which said iodide compound is methyl iodide.

32. A process as in claim 31 in which said contacting is also in the presence of water.

33. A process as in claim 32 in which methyl acetate is also present as a reactant.

* * * * *